US010653988B2

(12) United States Patent
Nagel

(10) Patent No.: US 10,653,988 B2
(45) Date of Patent: May 19, 2020

(54) AIR BRAKE FILTER AND METHOD

(71) Applicant: Donaldson Company, Inc., Minneapolis, MN (US)

(72) Inventor: Douglas Jon Nagel, Stout, IA (US)

(73) Assignee: Donaldson Company, Inc., Minneapolis, MN (US)

( * ) Notice: Subject to any disclaimer, the term of this patent is extended or adjusted under 35 U.S.C. 154(b) by 272 days.

(21) Appl. No.: 15/117,429

(22) PCT Filed: Feb. 13, 2015

(86) PCT No.: PCT/US2015/015794
§ 371 (c)(1),
(2) Date: Aug. 8, 2016

(87) PCT Pub. No.: WO2015/123508
PCT Pub. Date: Aug. 20, 2015

(65) Prior Publication Data
US 2016/0375393 A1    Dec. 29, 2016

Related U.S. Application Data

(60) Provisional application No. 61/940,148, filed on Feb. 14, 2014.

(51) Int. Cl.
*B01D 46/00* (2006.01)
*B60T 17/00* (2006.01)

(52) U.S. Cl.
CPC ..... *B01D 46/0086* (2013.01); *B01D 46/0087* (2013.01); *B60T 17/002* (2013.01)

(58) Field of Classification Search
None
See application file for complete search history.

(56) References Cited

U.S. PATENT DOCUMENTS

| 3,323,648 A | | 6/1967 | Rosaen |
| 3,591,003 A | | 7/1971 | Cooper et al. |
| 3,670,889 A | | 6/1972 | Brown et al. |
| 4,062,774 A | * | 12/1977 | Hinojosa ............... B01D 35/02 |
| | | | 210/232 |
| 5,879,544 A | | 3/1999 | Cassidy |
| 6,068,762 A | * | 5/2000 | Stone ..................... B01D 29/21 |
| | | | 210/90 |

(Continued)

FOREIGN PATENT DOCUMENTS

| DE | 7707192 U1 | 6/1977 |
| JP | S5913354 U | 1/1984 |

OTHER PUBLICATIONS

Patent Application No. EP15749642.3 (Intl Application No. PCT/US2015/015794), Extended European Search Report dated Nov. 7, 2017; 7 pages.

(Continued)

*Primary Examiner* — Amber R Orlando
*Assistant Examiner* — Brit E. Anbacht
(74) *Attorney, Agent, or Firm* — Mueting Raasch Group

(57) ABSTRACT

An air brake filter assembly and methods are shown. Example configurations include a filter lock that holds an indicator in an actuated position after a filter has become clogged. Example configurations may also include a bypass pathway to allow air to bypass the filter when the filter is clogged.

19 Claims, 13 Drawing Sheets

(56) References Cited

U.S. PATENT DOCUMENTS

| | | | | |
|---|---|---|---|---|
| 6,319,296 | B1* | 11/2001 | Fornof | B01D 46/0012 |
| | | | | 55/313 |
| 6,439,265 | B1* | 8/2002 | Gruschwitz | B60T 8/363 |
| | | | | 137/601.14 |
| 2005/0284802 | A1 | 12/2005 | Jankuski et al. | |
| 2013/0283980 | A1* | 10/2013 | Petrak | B60T 13/746 |
| | | | | 81/57 |
| 2015/0000516 | A1* | 1/2015 | Haruna | F16J 1/005 |
| | | | | 92/172 |

OTHER PUBLICATIONS

"International Application Serial No. PCT/US2015/015794, International Search Report dated May 5, 2015", 2 pgs.
"International Application Serial No. PCT/US2015/015794, Written Opinion dated May 18, 2015", 5 pgs.

\* cited by examiner

AIR BRAKE FILTER AND METHOD

RELATED APPLICATIONS

This application is a U.S. National Stage Filing under 35 U.S.C. 371 of International Patent Application Serial No. PCT/US2015/015794, filed Feb. 13, 2015 and published on Aug. 20, 2015 as WO 2015/123508 A1, which claims priority to U.S. Provisional Patent Application No. 61/940,148, entitled "AIR BRAKE FILTER AND METHOD," filed on Feb. 14, 2014, the benefit of priority of each of which is claimed hereby and each of which are incorporated by reference herein in its entirety.

TECHNICAL FIELD

Embodiments described herein generally relate to air brake systems. Selected examples relate to over the road truck air brake systems such as semi-trailer trucks.

BACKGROUND

Air brake systems have been in use on heavy vehicles for many years. To protect air brake systems from dirt and debris getting to vital components, filters are typically used throughout the system. Filter mesh screens may be used at the coupling location of a semi-truck trailer on the two air line hoses that run to the truck cab. These two air lines supply a constant air supply on one side for emergency system functions and a supply of air pressure to the brake function when the driver applies the brake pedal. Both of these filters can become easily clogged with dirt and debris when a truck/trailer combination is used in a fleet of other trailers. In some instances these filters must be cleaned on a daily basis to ensure proper brake function of the trailer. Improved air filter configurations are desired.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Although the following figures show devices in one particular orientation, one of ordinary skill in the art will recognize that the devices may be used in any number of orientations. Unless otherwise stated, directional references in the following description such as "up", "down" "top", "bottom" etc. are used with respect to the orientation of the device shown in the figure, regardless of the actual orientation of the device when in use.

Figure 1:
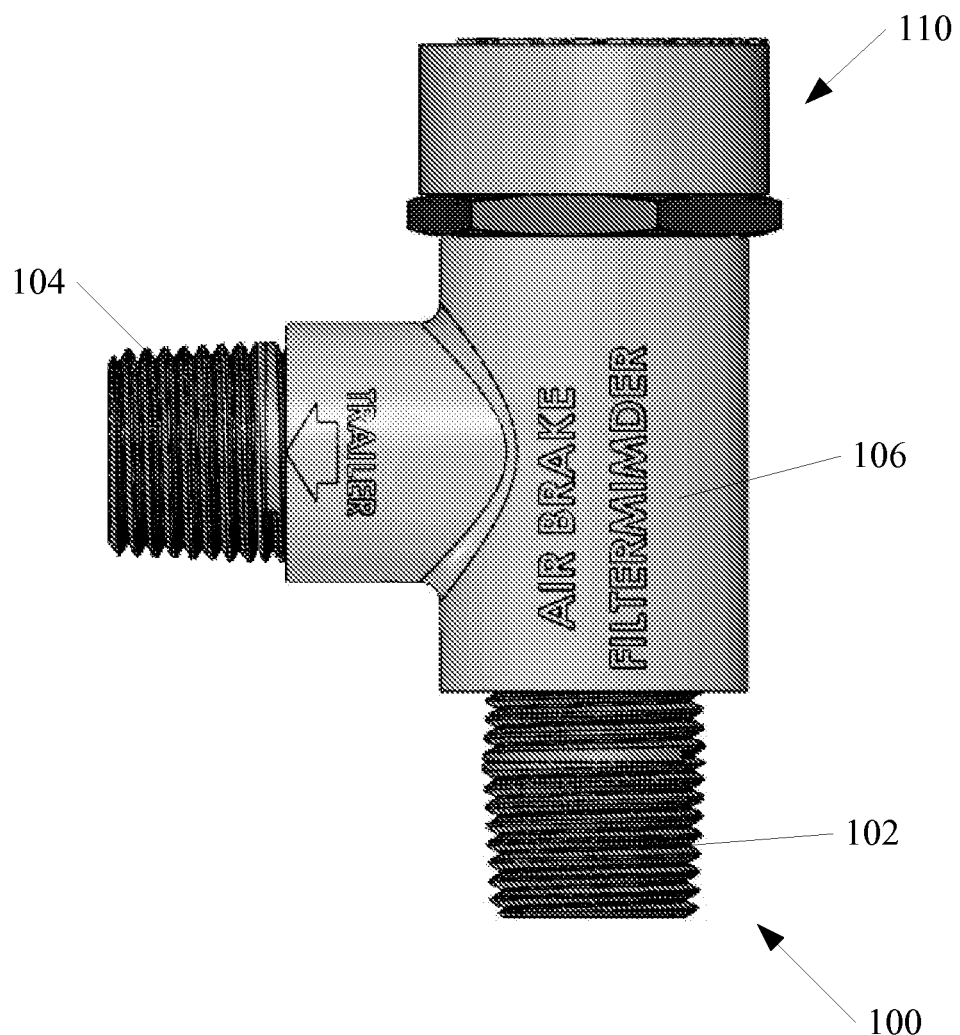
FIG. 1 is an air brake assembly in accordance with some embodiments of the invention.

FIG. 1 shows an air brake assembly 100 according to one example of the invention. The assembly 100 includes a first side air connection 102 and a second side air connection 104. In one example, the first side air connection 102 is coupled to an air source, such as a truck in a semi-truck example. In one example, the second side air connection 104 is coupled to a destination, such as a trailer in the semi-truck example. As noted above, it is desirable to provide a filter between a dirty side of a system and a clean side of the system. In the semi-truck example, the first side air connection 102 is dirty, and the second side air connection 104 is clean. A housing 106 is shown between the first side air connection 102 and the second side air connection 104, with an air brake filter assembly 110 coupled between the first side air connection 102 and the second side air connection 104. Examples of fittings 106 may include die cast aluminum, glass reinforced nylon, or other suitable materials.

Although the following detailed description uses an air brake example for a semi-truck as an example for illustration, the invention is not so limited. Other vehicles apart from semi-trucks that use air brake systems will also benefit from examples of the present invention. Other pneumatic systems such as air compressor systems will also benefit from examples of the present disclosure. Additionally other fluid media, such as water will also benefit from examples of the present disclosure. For example, in line water filtrations systems will benefit from examples of the present disclosure.

Figure 2:
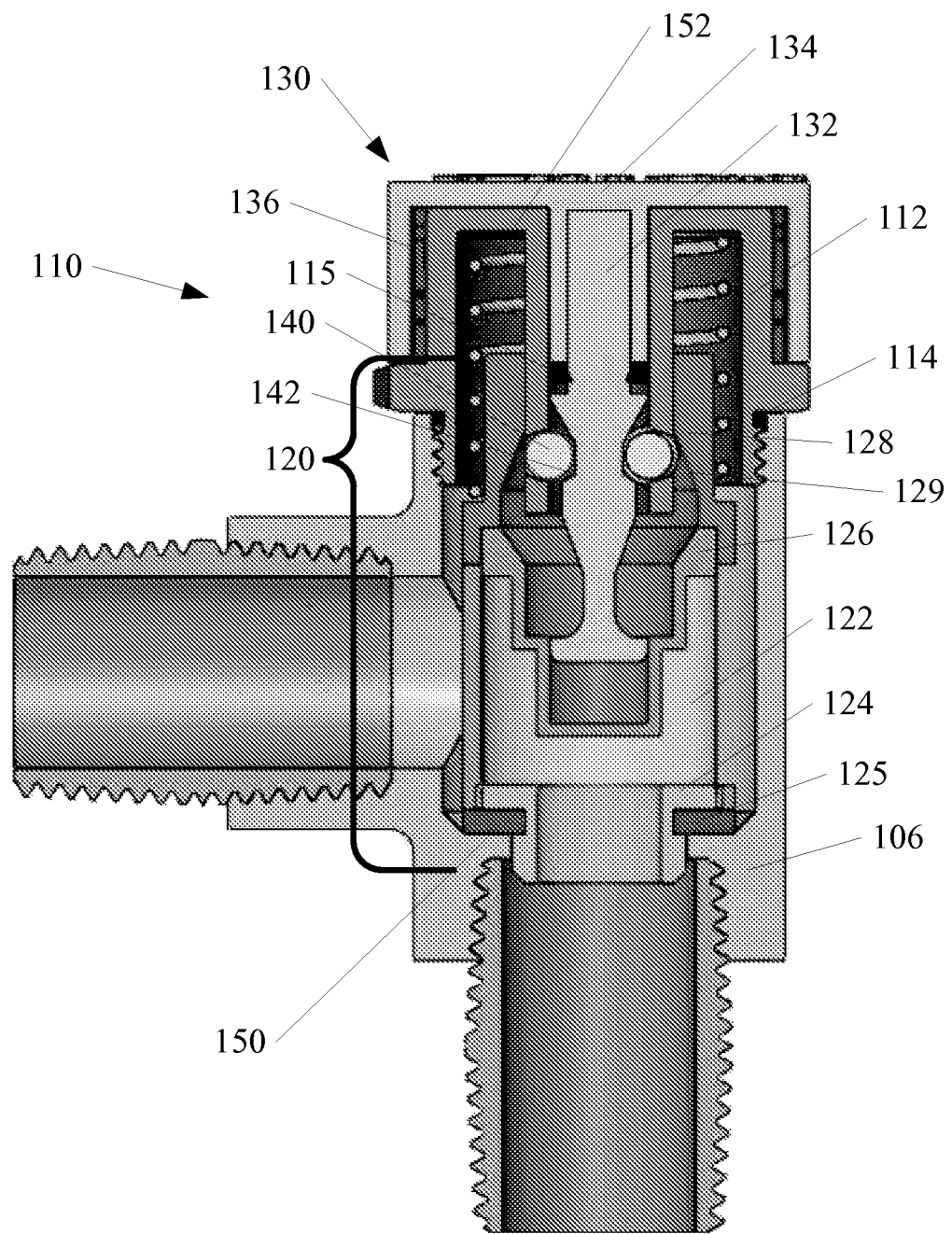
FIG. 2 is a cross section of an air brake assembly in a stage of operation in accordance with some embodiments of the invention.

FIG. 2 shows a cross section of an air brake filter assembly 110 housed within a housing 106 as shown in FIG. 1. The air brake filter assembly 110 includes a filter assembly base 112 and a filter cartridge 120 that is removably/replaceably coupled to the filter assembly base 112. The example of FIG. 2 shows a clogged filter indicator 130 coupled to the filter assembly base 112. In one example the clogged filter indicator 130 includes a piston 132 that pushes against a cap 134. In one example, the cap 134 covers a visual indicator 136, for example a red portion that, when visible, indicates a need to replace a clogged filter. In some examples, other colors than red may be used. Further, in some examples, text such as "REPLACE FILTER" may be written in the visual indicator 136.

In one example in addition to, or in place of the visual indicator 136, an electrical signal actuator is included (not shown in FIG. 2). In an electrical signal example, one or more mechanical components in the assembly 110 triggers an electrical component that transmits a signal remotely to a user. In one example the signal is transmitted to a dashboard of a vehicle or similar user interface. The electrical signal can then be used to alert the user of the condition of the filter, in a manner including, but not limited to, a clogged filter light or buzzer, etc.

In the example of FIG. 2, the filter cartridge 120 includes a filter overmold 126 that holds a filter 122. In one example, the filter 122 includes a cylindrical filter, although other geometries are also within the scope of the invention. In one example the filter 122 includes a stainless steel mesh, such as 302 stainless steel. In one example, the filter 122 includes approximately a 125 micro filter mesh. Other size filter media are also within the scope of the invention. The filter cartridge 120 of FIG. 2 further includes a plug cover 124 to mate with the housing 106 along an interface 150. In some examples, a washer 125 is included between the plug cover 124 and the housing 106. In one example, the washer 125 may include a rubber or other polymer material to form an air tight seal.

In the example shown, a number of components form the filter cartridge 120. In one example, one or more of the components may be referred to as a filter carrier. As described in examples below, in one method of operation, the filter and components attached to the filter as a filter carrier move in relation to the filter assembly base 112, and provide an actuation function for the clogged filter indicator 130.

In one example, the filter cartridge 120 further includes a lock 128. In one example, a locking feature includes a sloped sidewall 129 that will be discussed in more detail below. In the example shown, steps 142 on the piston 132 coordinate with at least one lock ball 140 and the sloped sidewalls 129 of the lock 128 to provide a locking function.

A number of o-rings 114 or u-seals 115, or other sealing components maybe included to provide air tight movement of components with respect to one another during operation of the air brake filter assembly 110.

Figure 3:
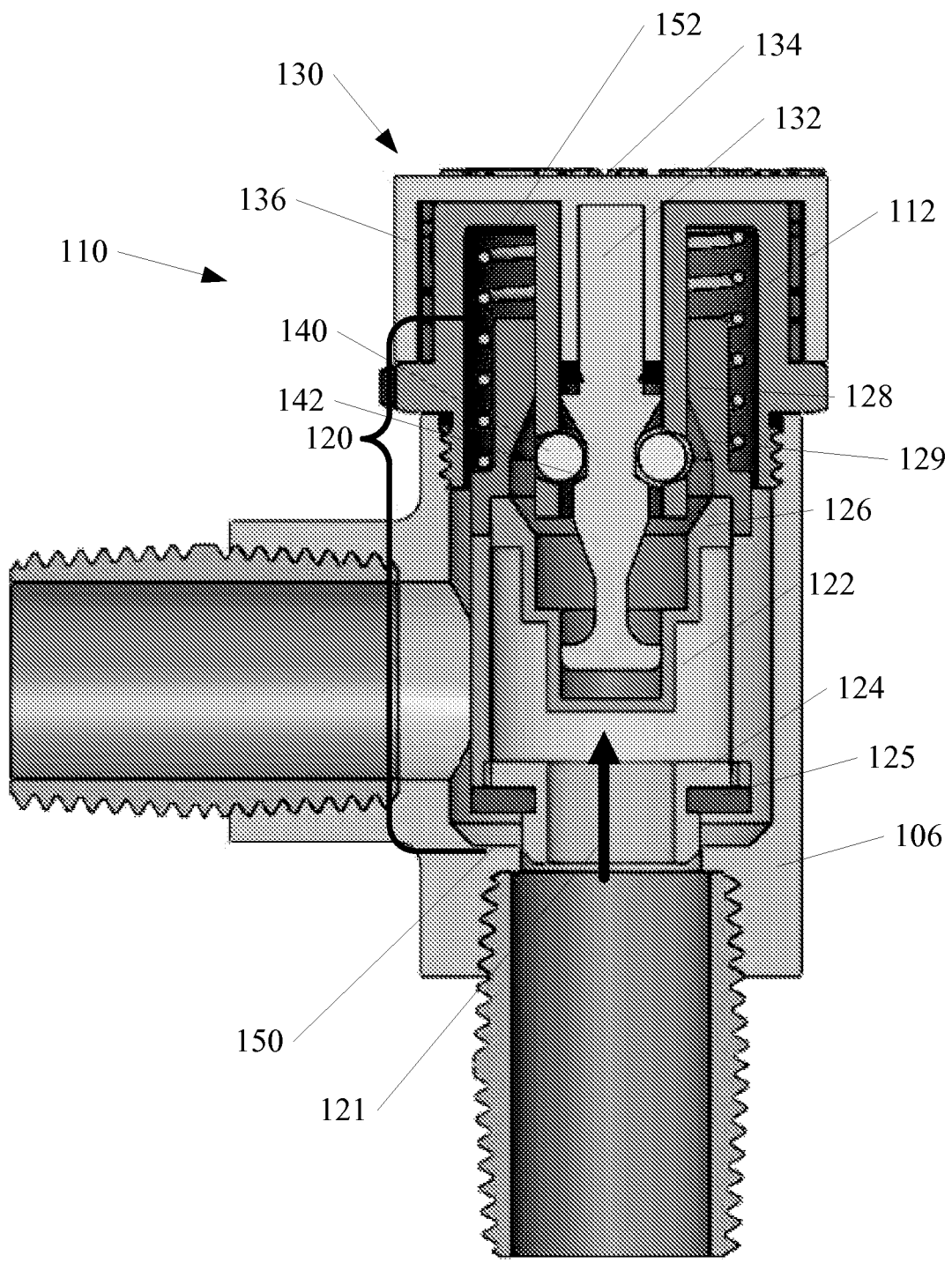
FIG. 3 is a cross section of an air brake assembly in a stage of operation in accordance with some embodiments of the invention.

FIG. 2 shows the example air brake filter assembly 110 in a state of operation where the filter 122 is not clogged. FIG. 3 shows operation of the air brake filter assembly 110, as the filter becomes clogged, and the clogged filter indicator 130 begins to actuate. In FIG. 3, the filter cartridge 120 has begun to move along direction of arrow 121 as a result of pressure in the system from the filter 122 becoming clogged. The washer 125 has moved apart from the interface 150 with the housing 106. Also, as shown in FIG. 3, the lock balls 140 are now located further down the sloped sidewall 129 of the lock 128.

Figure 4:
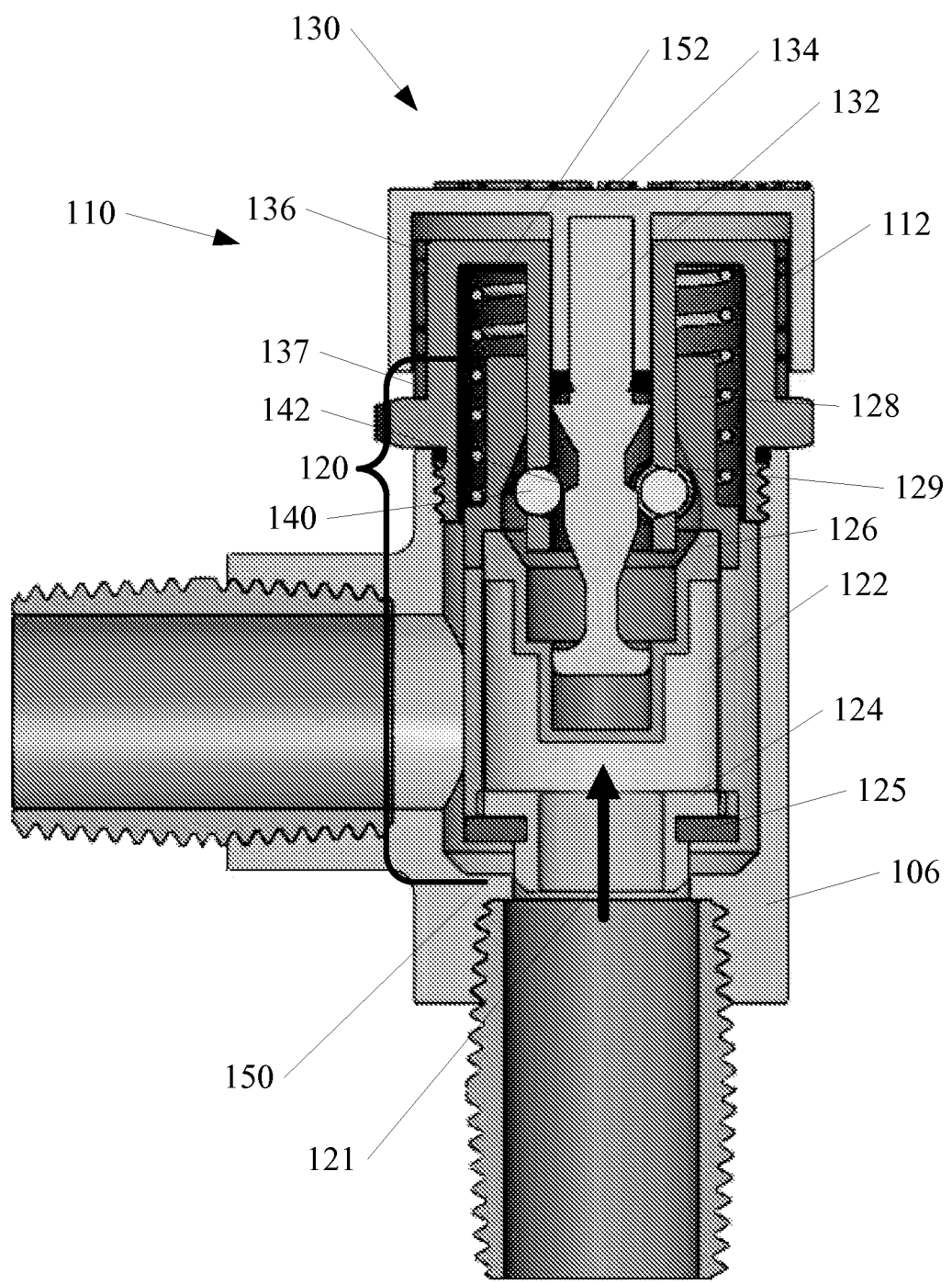
FIG. 4 is a cross section of an air brake assembly in a stage of operation in accordance with some embodiments of the invention.

FIG. 4 shows a lock release point in operation of the air brake filter assembly 110. The lock balls 140 are now able to move outward to allow the steps 142 on the piston 132 to clear the lock balls 140, allowing for actuation of the piston 132 upwards. The position of the sloped sidewall 129 of the lock 128, as shown in the location of FIG. 4, allows the lock balls 140 to move outward. The motion of the filter cartridge 120 upward along direction 121 releases the lock 128.

As can be seen in FIG. 4, as the piston 132 moves upward, the cap 134 moves along with the piston 132, and the visual indicator 136 begins to show an exposed portion 137. In the example shown, motion of the piston 132 is actuated by system pressure, in contrast to any actuation spring to force the piston 132 upward after release of the lock 128. In other examples, a spring or other biasing device may be used to actuate the piston 132.

In the example shown, a spring 152 is included in the air brake filter assembly 110, and biases against motion of the filter cartridge 120. In one example, a spring force of the spring 152 is chosen to set an actuation pressure of the clogged filter indicator 130. At the point of actuation of the clogged filter indicator 130, as shown in FIG. 4, the washer 125 is still leaving a gap at the interface 150 of the housing 106.

Figure 5:
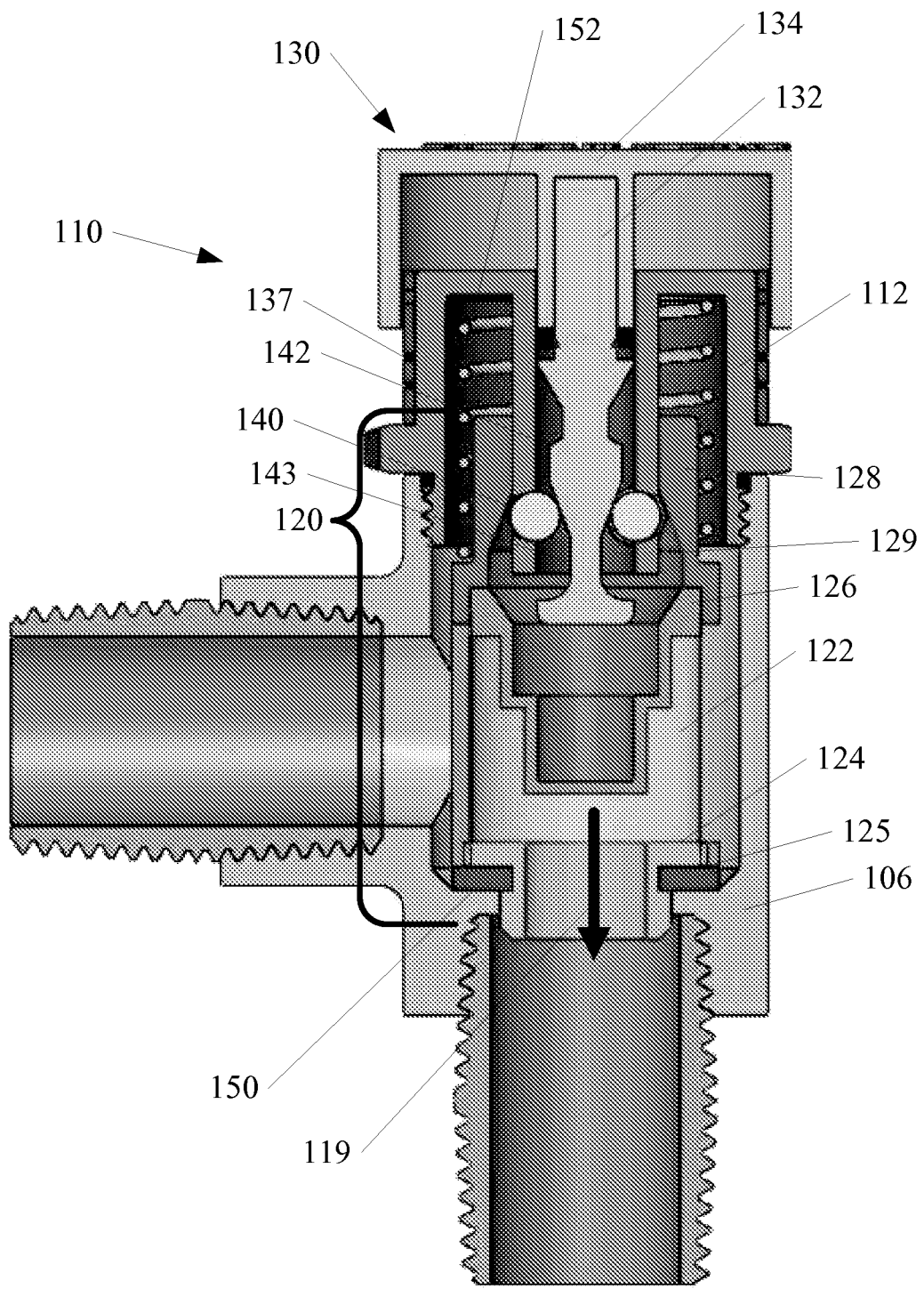
FIG. 5 is a cross section of an air brake assembly in a stage of operation in accordance with some embodiments of the invention.

FIG. 5 shows the air brake filter assembly 110 after actuation of the clogged filter indicator 130. The cap 134 is extended and the exposed portion 137 of the visual indicator 136 is large enough to be a warning to the user of the system. The lock balls 140 have moved onto lower steps 143 of the piston 132. The filter cartridge 120 has moved back down along direction 119, and the washer 125 is again in contact with the interface 150 of the housing 106.

In this configuration shown in FIG. 5, the sloped sidewall 129 of the lock 128 once again locks the lock balls 140 against the piston 132 within the lower steps 143. Because of this condition of the components, the clogged filter indicator 130 is not resettable by a user. Any pressure on the cap 134 at this point presses the lower steps 143 of the piston 132 outward against the lock balls 140. The sloped sidewall 129 of the lock 128 prevent the piston 132 from being pushed down.

If the user desires to reset the clogged filter indicator 130 at this point, the only option is to remove the filter assembly base 112 and the filter cartridge 120 as a unit (shown in FIG. 10), and to push the filter cartridge 120 upward while depressing the cap 134. It is desirable, once the filter assembly base 112 and the filter cartridge 120 as a unit are removed, to replace the clogged filter cartridge 120 with a new filter cartridge 120. One advantage of the air brake filter assembly 110 is that the clogged filter indicator 130 is not user resettable without first removing the filter cartridge 120. This prevents a user from merely resetting the clogged filter indicator 130 multiple times without actually changing the clogged filter.

Figure 6:
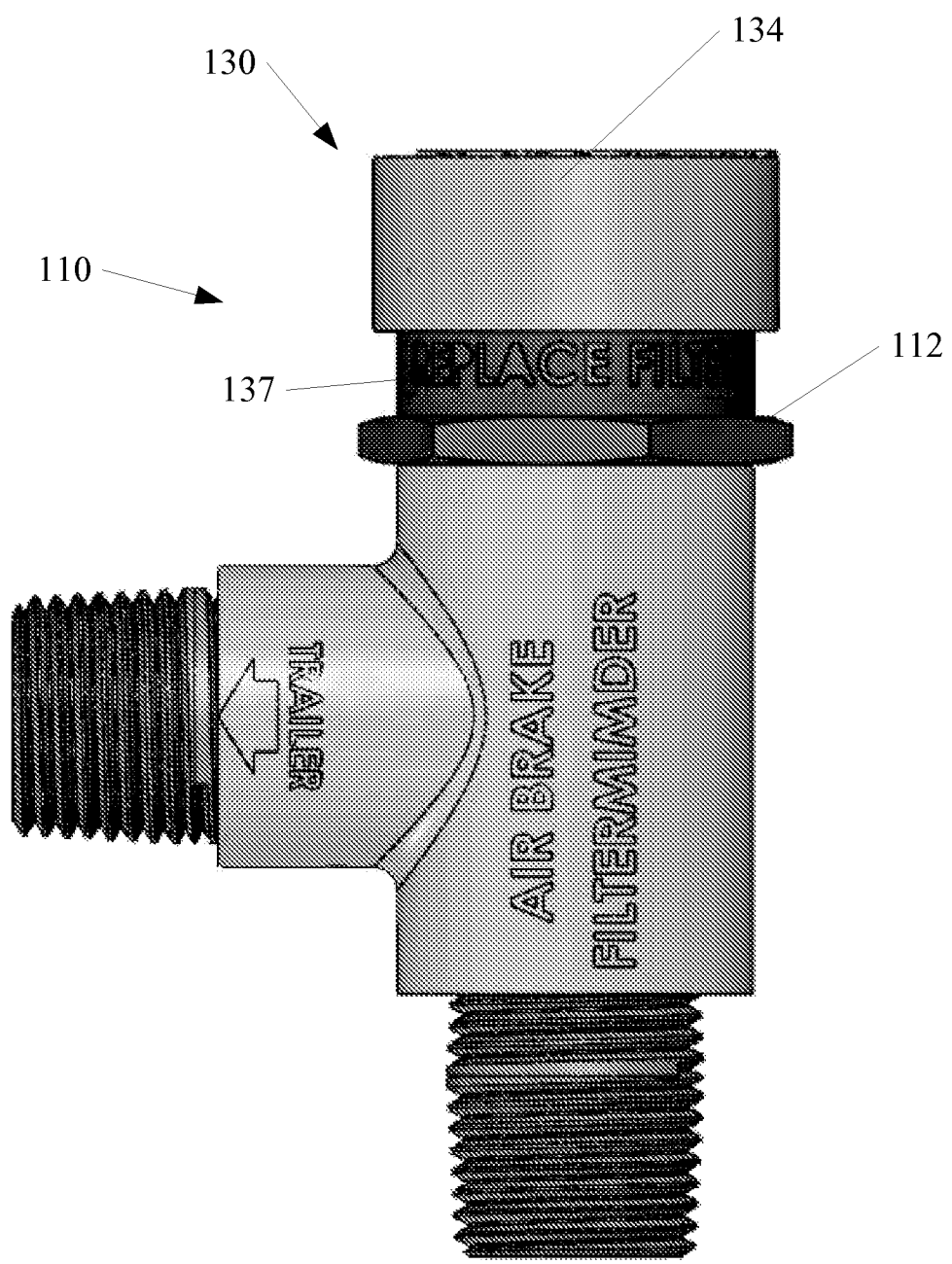
FIG. 6 is an air brake assembly in a stage of operation in accordance with some embodiments of the invention.

FIG. 6 shows an exterior front view of the air brake filter assembly 110. As can be seen in the figure, the cap 134 is moved upward, and the exposed portion 137 of the visual indicator 136 is exposed.

Figure 7:
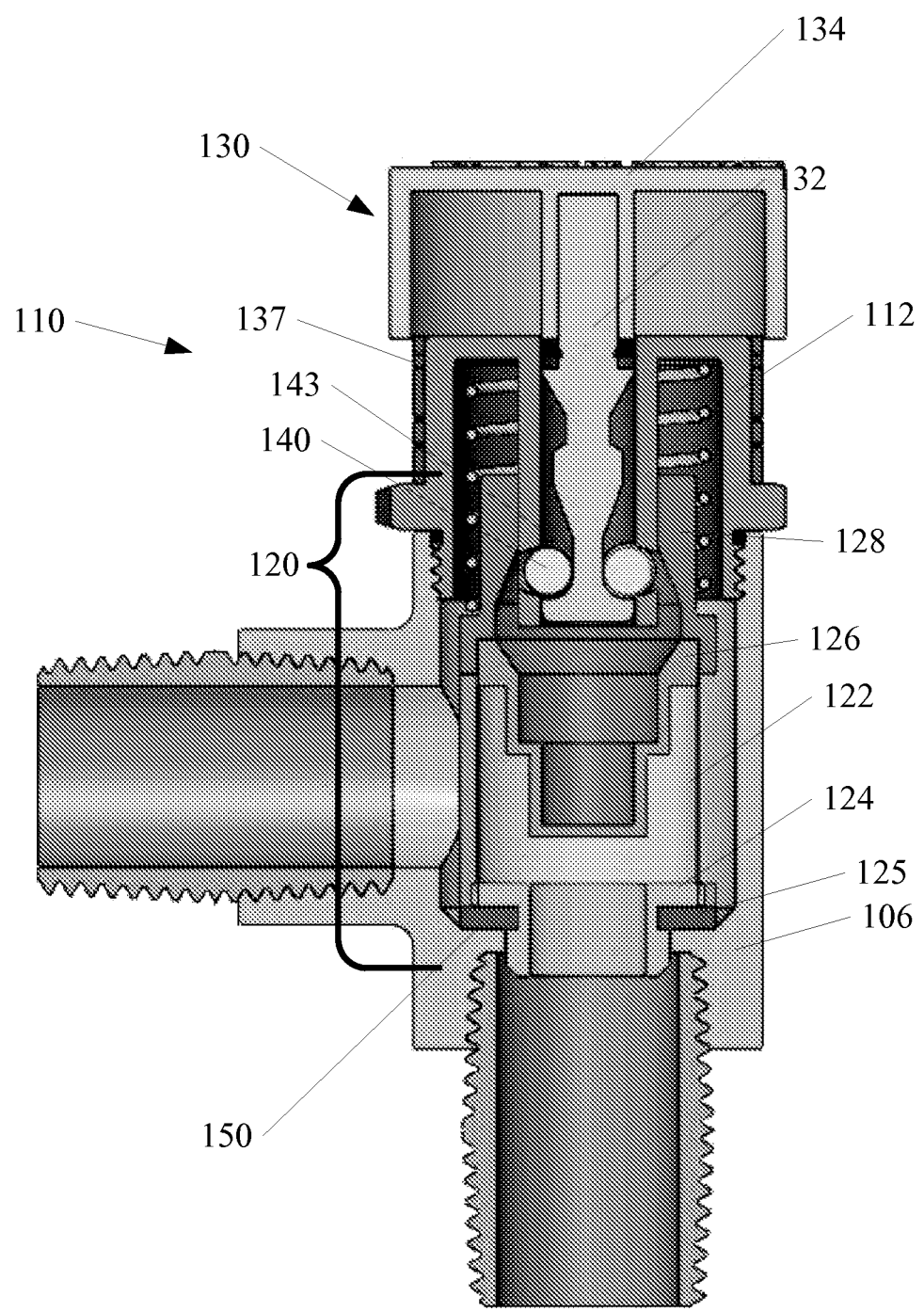
FIG. 7 is a cross section of an air brake assembly in a stage of operation in accordance with some embodiments of the invention.

FIG. 7 shows the air brake filter assembly 110 condition after lock actuation if the clogged filter is not replaced. The piston 132 is pushed upward to its limit against the lower steps 143 of the piston 132. The lock balls 140 are holding the piston 132, and the lock balls 140 are also locked against the sloped sidewall 129 of the lock 128. In the condition of FIG. 7, the washer 125 is still in contact with the interface 150 of the housing 106.

Figure 8:
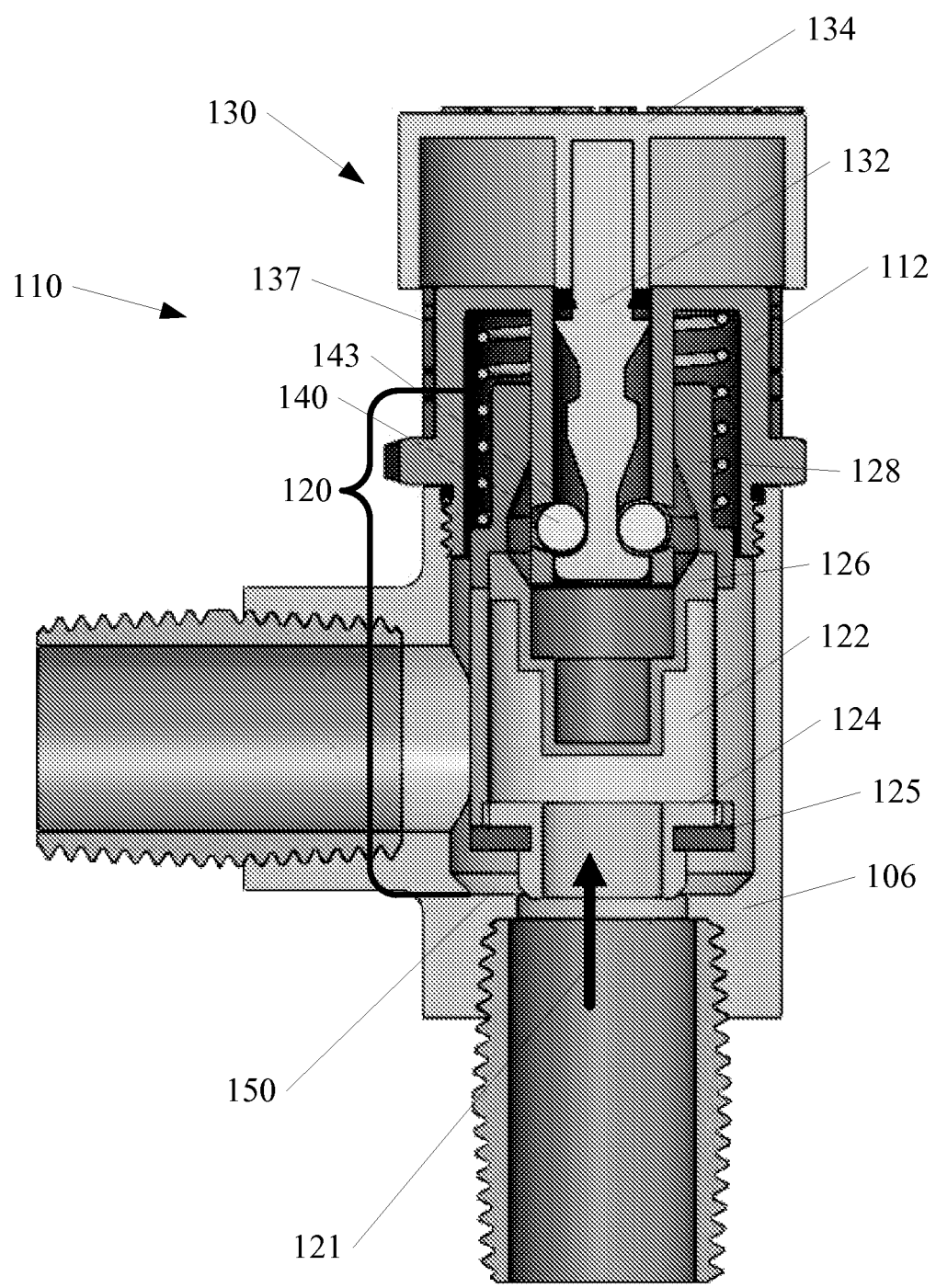
FIG. 8 is a cross section of an air brake assembly in a stage of operation in accordance with some embodiments of the invention.

In FIG. 8, because the filter cartridge 120 is still clogged, even though the clogged filter indicator 130 is fully extended, pressure is still being exerted on the clogged filter cartridge 120. If the brakes are still being operated, it is desirable that the brakes continue to work, even though the filter 122 is clogged. In this condition, the filter cartridge 120 once again is forced upward along direction 121, and the washer 125 becomes unseated from the interface 150 of the housing 106.

Figure 9:
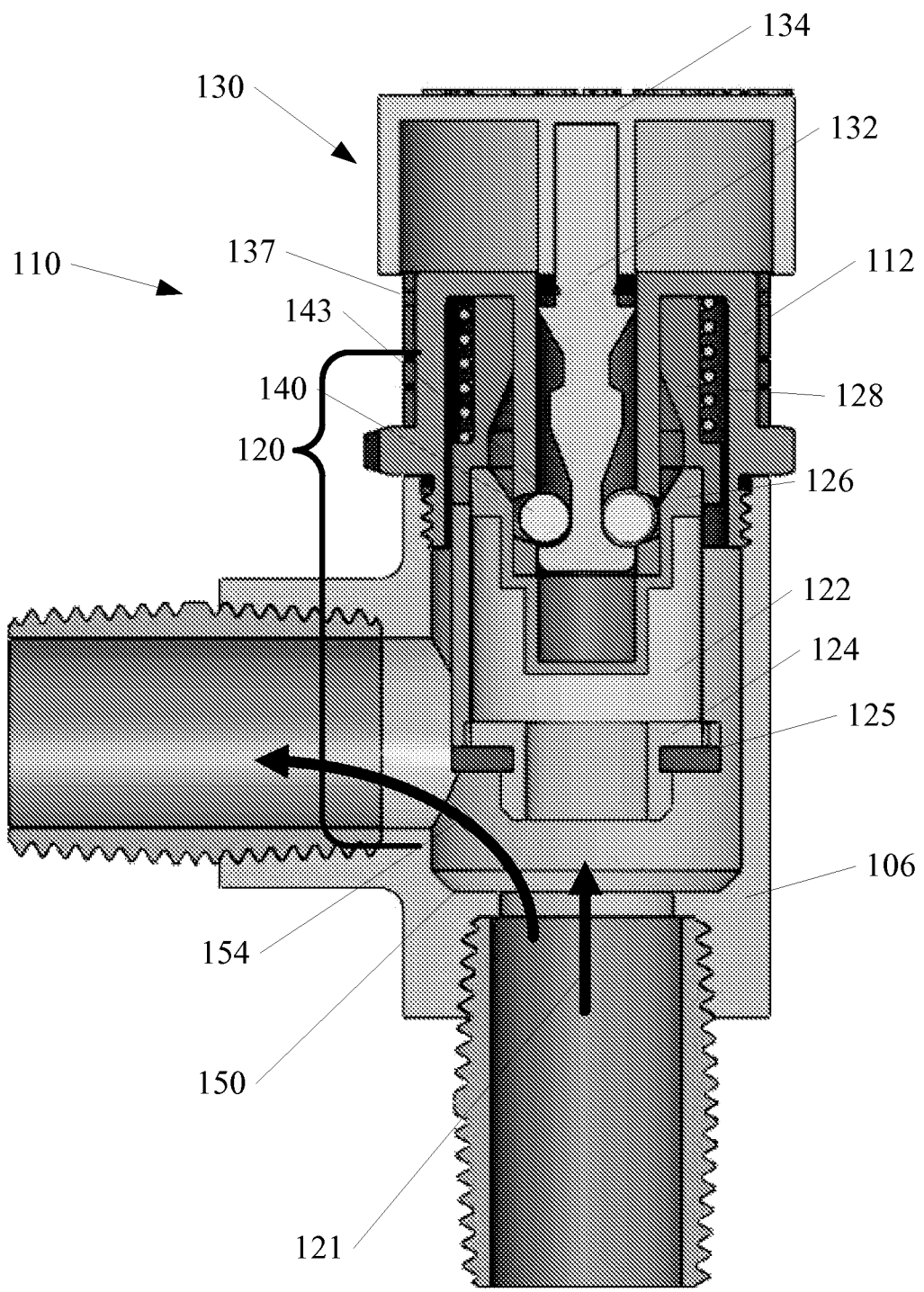
FIG. 9 is a cross section of an air brake assembly in a stage of operation in accordance with some embodiments of the invention.

In FIG. 9, the filter cartridge 120 is forced further along direction 121 such that a bypass pathway 154 is created. In this condition, even though the filter cartridge 120 is clogged, and the clogged filter indicator 130 is extended, the air brakes of the vehicle will remain functioning due to the bypass 154. In the example shown, the bypass 154 is dynamic, and will open in response to need when the filter cartridge 120 is clogged. In the example shown, the bypass function is independent of the clogged filter indicator 130.

Figure 10:
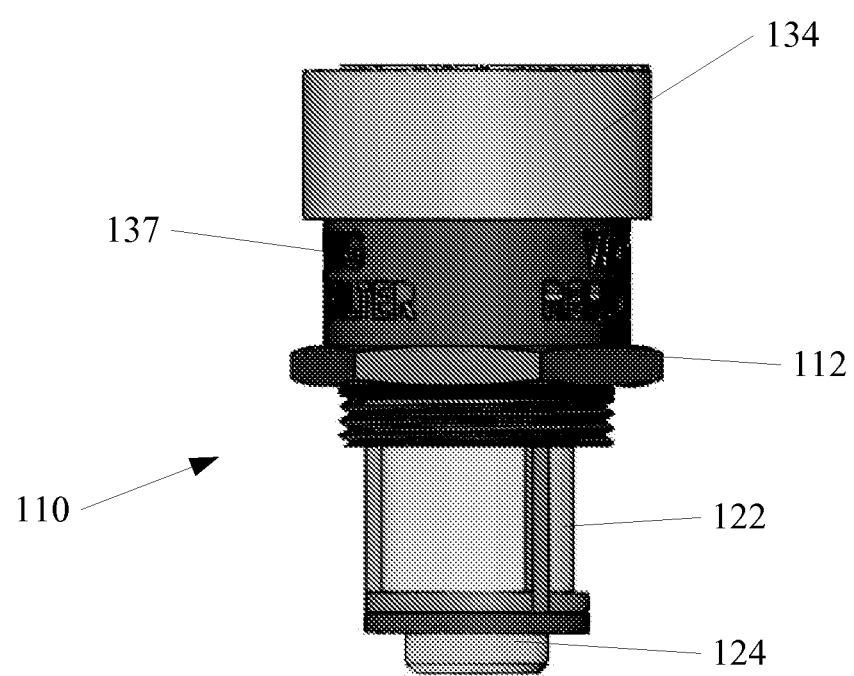
FIG. 10 is air brake filter assembly in accordance with some embodiments of the invention.

FIG. 10 shows the air brake filter assembly 110, including the filter assembly base 112, the clogged filter indicator 130 and the filter cartridge 120 removed from the housing 106 for replacement. In a replacement operation, the filter cartridge 120 will be removed downward from the filter assembly base 112, and a clean replacement filter cartridge 120 will be inserted in its place. As noted above, in order to reset the clogged filter indicator 130, the new filter cartridge 120 will be pushed an appropriate amount against the spring 152 to unlock the lock 128, and allow the piston 132 and cap 134 to be pushed down over the exposed portion 137 of the visual indicator 136. The air brake filter assembly 110 with the replacement filter cartridge 120 can now be re-inserted in the housing 106. In another example, the air brake filter assembly 110 is replaced as a unit, and the filter cartridge 120 is not removed from the filter assembly base 112. In another example, the filter overmold 126 and filter 122 are replaced as a unit when clogged, and other components are reused.

Figure 11:
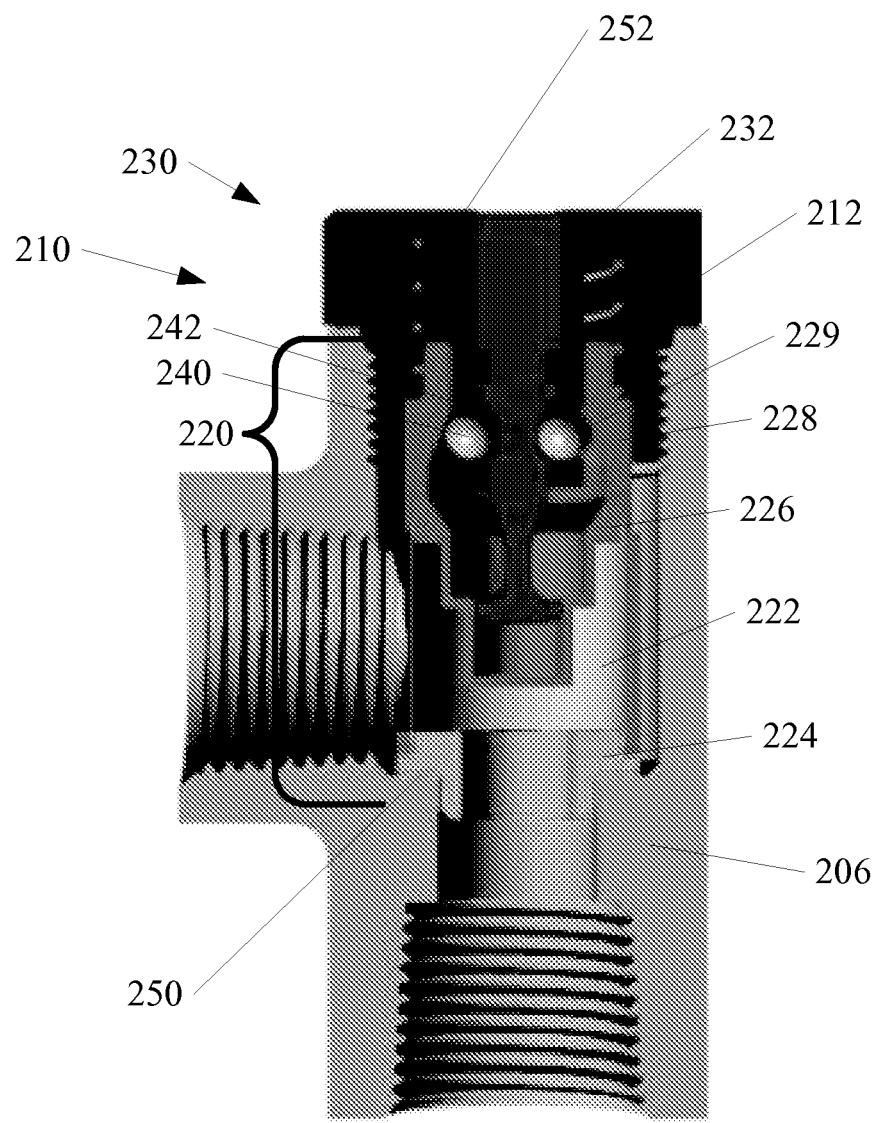
FIG. 11 is a cross section of an air brake assembly in a stage of operation in accordance with some embodiments of the invention.

FIG. 11 shows a variation of an air brake filter assembly 210. Similar to the air brake filter assembly 110, the assembly 210 includes a filter assembly base 212 and a filter cartridge 220 that is removably/replaceably coupled to the filter assembly base 212. The example of FIG. 11 shows a clogged filter indicator 230 coupled to the filter assembly base 212. In one example the clogged filter indicator 230 includes a piston 232. In the example of FIG. 11, the piston 232 may be colored red, or include an eye catching characteristic that indicates to a user that the filter cartridge 220 is clogged.

Similar to the air brake filter assembly 110, in the example of FIG. 11, the filter cartridge 220 includes a filter overmold 226 that holds a filter 222. In one example, the filter 222 includes a cylindrical filter, although other geometries are also within the scope of the invention. As in examples above, in one example the filter 222 includes a stainless steel mesh, such as 302 stainless steel. The filter cartridge 220 of FIG. 11 further includes a plug cover 224 to mate with a fitting 206 along an interface 250.

In one example, the filter cartridge 220 further includes a lock 228. In the example shown, steps 242 on the piston 232 coordinate with at least one lock ball 240 and sloped sidewalls 229 of the lock 228 to provide a locking function.

Figure 12:
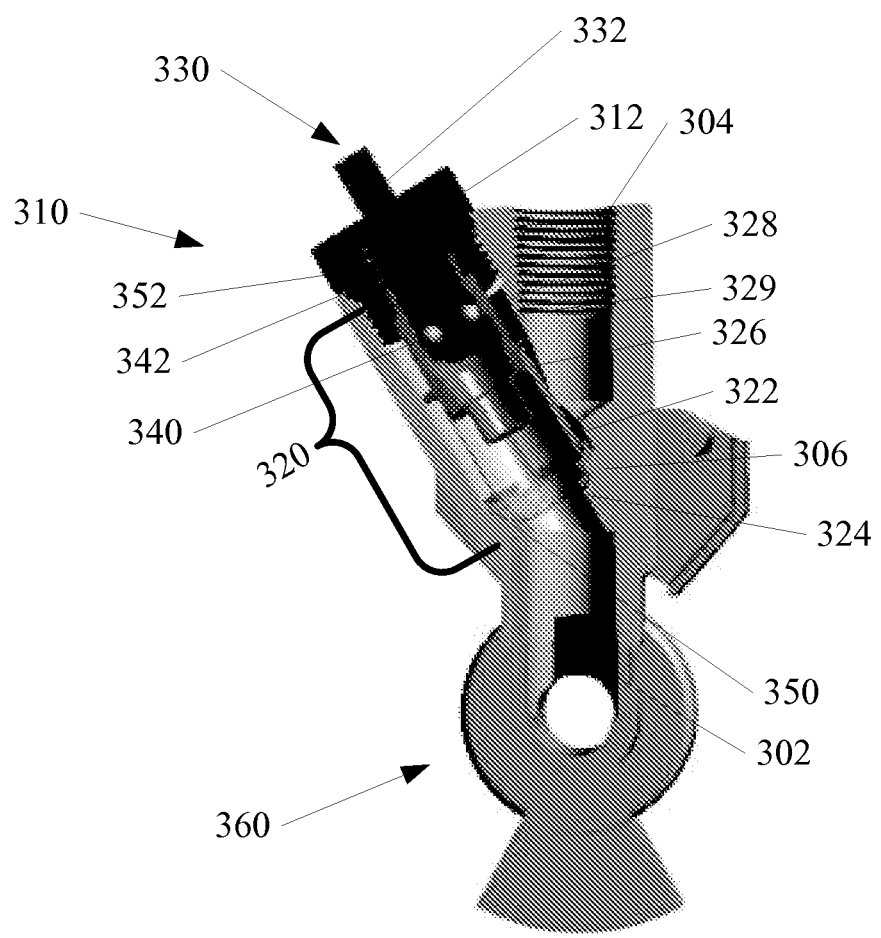
FIG. 12 is a cross section of another air brake assembly in a stage of operation in accordance with some embodiments of the invention.

FIG. 12 shows a variation of an air brake filter assembly 310. Similar to the air brake filter assemblies 110 and 210, the assembly 310 includes a filter assembly base 312 and a filter cartridge 320 that is removably/replaceably coupled to the filter assembly base 312. The example of FIG. 12 shows a clogged filter indicator 330 coupled to the filter assembly base 212. In one example the clogged filter indicator 330 includes a piston 332. In the example of FIG. 12, the piston 332 may be colored red, or include an eye catching characteristic that indicates to a user that the filter cartridge 320 is clogged.

Similar to air brake filter assembly examples 110 and 210, in the example of FIG. 12, the filter cartridge 320 includes a filter overmold 326 that holds a filter 322. In one example, the filter 322 includes a cylindrical filter, although other geometries are also within the scope of the invention. As in examples above, in one example the filter 322 includes a stainless steel mesh, such as 302 stainless steel. The filter cartridge 320 of FIG. 12 further includes a plug cover 324 to mate with a fitting 306 along an interface 350.

In one example, the filter cartridge 320 further includes a lock 328. In the example shown, steps 342 on the piston 332 coordinate with at least one lock ball 340 and sloped sidewalls 329 of the lock 328 to provide a locking function.

In the example of FIG. 12, a first side air connection 302 is coupled to an air source, such as a truck in a semi-truck example. In one example, a second side air connection 304 is coupled to a destination, such as a trailer in the semi-truck example. In one example, the first side air connection 302 includes a glad hand configuration connector 360. In the example of a semi-truck end use, a common fitting type may include a glad hand configuration, although the invention is not so limited. Railroad applications may also use a glad hand configuration. Other fitting configurations, apart from threaded configurations, or glad hand configurations are also within the scope of the invention.

Although three different examples of air brake filter assemblies 110, 210, and 310 are shown, one of ordinary skill in the art, having the benefit of the present disclosure will recognize that other configurations are possible within the scope of the invention.

Figure 13:
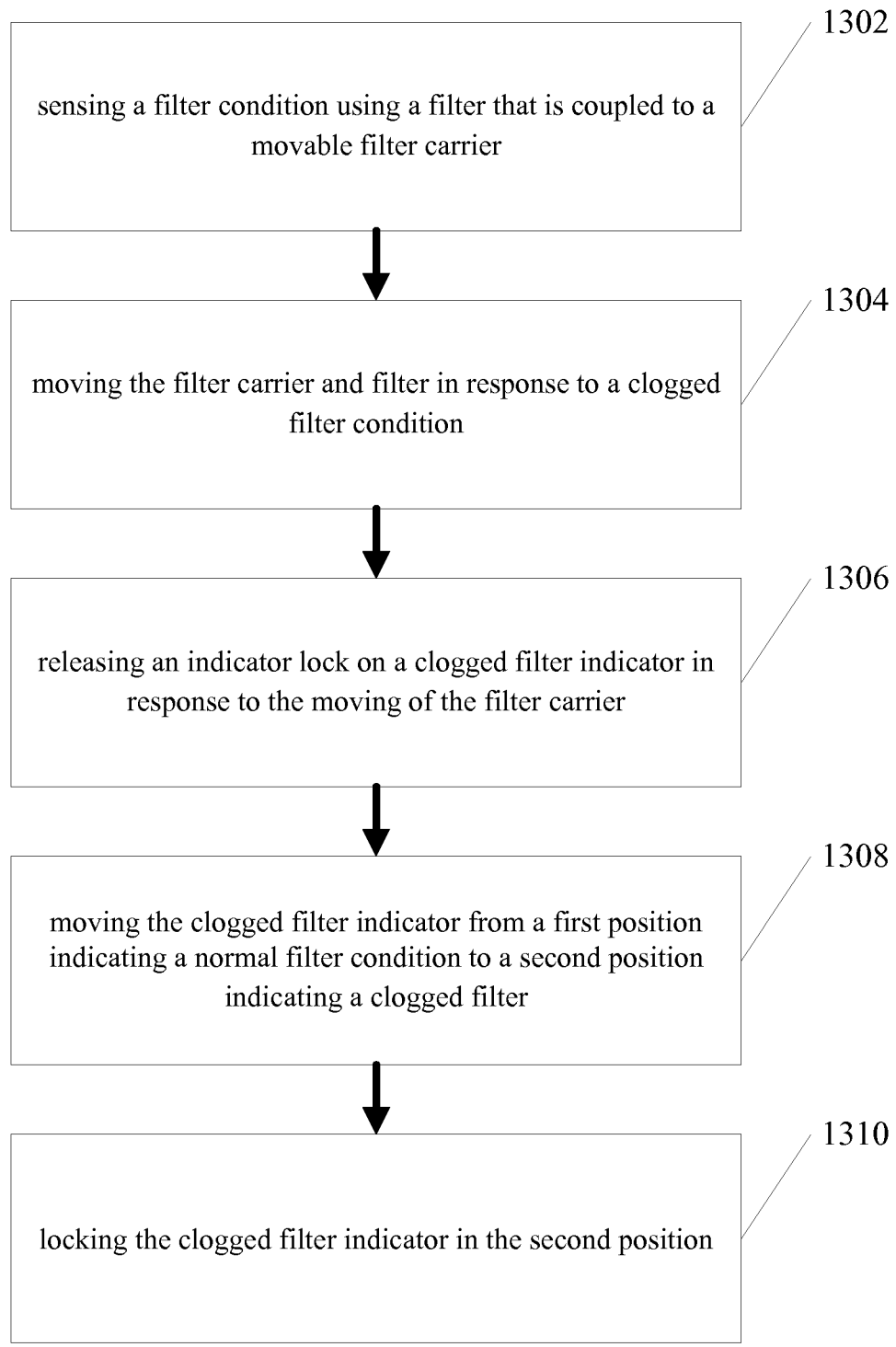
FIG. 13 is a flow diagram of an example method of operation in accordance with some embodiments of the invention.

FIG. 13 shows an example method of operation of an air brake filter assembly according to an embodiment of the invention. In operation 1302, a filter condition is sensed using a filter that is coupled to a movable filter carrier. In one example, a filter cartridge 120, 220, 320, etc. functions as a filter carrier. In operation 1304, the filter carrier and filter is moved in response to a clogged filter condition. In operation 1306, an indicator lock on a clogged filter indicator is released in response to the moving of the filter carrier. In operation 1308, the clogged filter indicator is moved from a first position indicating a normal filter condition to a second position indicating a clogged filter. In operation 1310, the clogged filter indicator is locked in the second position.

To better illustrate the method and apparatuses disclosed herein, a non-limiting list of embodiments is provided here:

Example 1 includes an air brake filter assembly. The air brake filter assembly may include a filter assembly base, a filter coupled to the filter assembly base, a clogged filter indicator coupled to the filter assembly base and movable from a first position indicating a normal filter condition to a second position indicating a clogged filter, and a bypass pathway to allow air to bypass the filter when the filter is clogged.

Example 2 includes the air brake filter assembly of example 1, wherein the bypass pathway is dynamic.

Example 3 includes the air brake filter assembly of any one of examples 1-2, further including a filter carrier wherein the filter carrier can be forced to move under pressure, if the filter is clogged, to unlock the clogged filter indicator and allow motion from the first position to the second position.

Example 4 includes the air brake filter assembly of any one of examples 1-3, further including a second position lock.

Example 5 includes the air brake filter assembly of any one of examples 1-4, wherein the clogged filter indicator is configured to move from the first position to the second position using line pressure.

Example 6 includes the air brake filter assembly of any one of examples 1-5, wherein the lock includes at least one lock ball abutting a stepped piston.

Example 7 includes the air brake filter assembly of any one of examples 1-6, wherein the base is reusable and a filter is replaceable.

Example 8 includes an air brake filter assembly, including a filter assembly base, a filter coupled to the filter assembly base, a clogged filter indicator coupled to the filter assembly base and movable from a first position indicating a normal filter condition to a second position indicating a clogged filter, and an indicator lock to hold the clogged filter indicator in the first position until the filter becomes clogged, and to lock the clogged filter indicator in the second position after actuation of the indicator lock.

Example 9 includes the air brake filter assembly of example 8, further including a bypass pathway to allow air to bypass the filter when the filter is clogged.

Example 10 includes the air brake filter assembly of any one of examples 8-9, wherein the indicator lock is biased with a spring to set an actuation pressure.

Example 11 includes the air brake filter assembly of any one of examples 8-10, wherein the lock includes a stepped piston.

Example 12 includes the air brake filter assembly of any one of examples 8-11, wherein the lock includes at least one bearing ball that engages steps on the stepped piston.

Example 13 includes the air brake filter assembly of any one of examples 8-12, wherein the filter is a cylinder.

Example 14 includes a filter cartridge for an air brake filter assembly, including a filter carrier, a filter coupled to the filter carrier, and a lock coupled to the filter carrier to engage a clogged filter indicator.

Example 15 includes a filter cartridge of example 14, wherein the filter is a cylinder.

Example 16 includes the filter cartridge of any one of examples 14-15, wherein the lock includes a stepped surface to engage at least one lock ball.

Example 17 includes a method including sensing a filter condition using a filter that is coupled to a movable filter carrier, moving the filter carrier and filter in response to a clogged filter condition, releasing an indicator lock on a clogged filter indicator in response to the moving of the filter carrier, moving the clogged filter indicator from a first position indicating a normal filter condition to a second position indicating a clogged filter, and locking the clogged filter indicator in the second position.

Example 18 includes the method of example 17, wherein locking the clogged filter indicator in the second position is in response to the moving of the filter carrier.

Example 19 includes the method of any one of examples 17-18, further including bypassing a clogged filter to provide line pressure while the clogged filter indicator is locked in the second position.

Example 20 includes the method of any one of examples 17-19, further including replacing a clogged filter with a new filter and resetting the clogged filter indicator.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An air brake filter assembly, comprising:
   a filter assembly base;
   a filter coupled to the filter assembly base;
   a clogged filter indicator coupled to the filter assembly base and moveable from a first position indicating a normal filter condition to a second position indicating a clogged filter;
   a bypass pathway to allow air to bypass the filter when the filter is clogged, wherein the bypass pathway opens in response to the filter moving relative to the filter assembly base;
   a stepped piston comprising at least two different steps along the piston corresponding to the first position and the second position; and
   at least one lock ball configured to engage a first step of the stepped piston in the first position and to engage a second step of the stepped piston in the second position.

2. The air brake filter assembly of claim 1, wherein the bypass pathway is dynamic.

3. The air brake filter assembly of claim 1, further including a filter carrier wherein the filter carrier can be forced to move under pressure, if the filter is clogged, to unlock the clogged filter indicator and allow motion from the first position to the second position.

4. The air brake filter assembly of claim 1, further including a second position lock.

5. The air brake filter assembly of claim 1, wherein the clogged filter indicator is configured to move from the first position to the second position using line pressure.

6. The air brake filter assembly of claim 1, wherein the base is reusable and the filter is replaceable.

7. An air brake filter assembly, comprising:
a filter assembly base;
a filter coupled to the filter assembly base;
a clogged filter indicator coupled to the filter assembly base and moveable from a first position indicating a normal filter condition to a second position indicating a clogged filter; and
an indicator lock to hold the clogged filter indicator in the first position until the filter becomes clogged, and to lock the clogged filter indicator in the second position after actuation of the indicator lock, wherein the indicator lock comprises a stepped piston comprising at least two different steps along the piston corresponding to the first position and the second position, wherein the indicator lock comprises at least one lock ball configured to engage a first step of the stepped piston in the first position and to engage a second step of the stepped piston in the second position.

8. The air brake filter assembly of claim 7, further including a bypass pathway to allow air to bypass the filter when the filter is clogged.

9. The air brake filter assembly of claim 7, wherein the indicator lock is biased with a spring to set an actuation pressure.

10. The air brake filter assembly of claim 8, wherein the bypass pathway opens in response to the filter moving relative to the filter assembly base.

11. The air brake filter assembly of claim 7, wherein the filter is a cylinder.

12. A filter cartridge for an air brake filter assembly, comprising:
a filter carrier;
a filter coupled to the filter carrier; and
a lock coupled to the filter carrier to engage a clogged filter indicator, wherein the lock includes a stepped piston comprising at least two different steps along the piston, the at least two different steps comprising a first step configured to engage at least one lock ball in a first position and a second step configured to engage the at least one lock ball in a second position, wherein the piston defines a surface extending between the first step and the second step, wherein the surface is configured to engage the at least one lock ball continuously when the at least one lock ball is moved from the first step to the second step.

13. The filter cartridge of claim 12, wherein the filter is a cylinder.

14. The filter cartridge of claim 12, wherein the lock further comprises the at least one lock ball configured to engage the first step of the stepped piston in the first position and to engage the second step of the stepped piston in the second position.

15. A method, comprising:
sensing a filter condition using a filter that is coupled to a movable filter carrier;
moving the filter carrier and filter in response to a clogged filter condition;
releasing an indicator lock on a clogged filter indicator in response to the moving of the filter carrier;
moving the clogged filter indicator from a first position indicating a normal filter condition to a second position indicating a clogged filter, wherein the first position corresponds to a first step of a stepped piston and the second position corresponds to a second step of the stepped piston, wherein at least one lock ball engages the first step of the stepped piston in the first position;
locking the clogged filter indicator in the second position, wherein the at least one lock ball engages the second step in the second position; and
moving the filter carrier and filter to open a bypass pathway in response to line pressure.

16. The method of claim 15, wherein locking the clogged filter indicator in the second position is in response to the moving of the filter carrier.

17. The method of claim 15, further including bypassing a clogged filter to provide line pressure while the clogged filter indicator is locked in the second position.

18. The method of claim 15, further including replacing a clogged filter with a new filter and resetting the clogged filter indicator.

19. The method of claim 15, further including generating an electrical signal in response to the clogged filter indicator, and transmitting the electrical signal to a remote filter condition indicator to alert a user of a filter condition.

\* \* \* \* \*